Nov. 17, 1925.  
W. G. WILSON  
CANDY COOLING TABLE  
Filed Oct. 29, 1924

1,561,894

Inventor  
William G. Wilson  
by  
Attorney

Patented Nov. 17, 1925.

1,561,894

UNITED STATES PATENT OFFICE.

WILLIAM G. WILSON, OF STRATFORD, CONNECTICUT.

CANDY-COOLING TABLE.

Application filed October 29, 1924. Serial No. 746,624.

*To all whom it may concern:*

Be it known that I, WILLIAM G. WILSON, a citizen of the United States, residing at the town of Stratford, in the county of Fairfield and State of Connecticut, have invented certain new and useful Improvements in Candy-Cooling Tables; and I do declare the following to be a full, clear, and exact description of the invention, such as will enable others skilled in the art to which it appertains to make and use the same.

My invention relates to candy cooling tables, and has for its object to keep the table cool by an agitated body of water the supply of which is being constantly renewed.

A further object of the invention is to provide water containing tubes that are easy of access and that can be thoroughly cleaned and even withdrawn without removing the top plate or table proper from the water pan.

A still further object of the invention is to always maintain a water level in the pan which is above the water supply jets, so that the main body of water is continuously driven and swirled against the inner wall of the table, whereby the cooling action of the water is effective throughout the entire area of said wall.

In the accompanying drawings—

Similar numerals of reference denote like parts in the several figures of the drawing.

Figure 1:
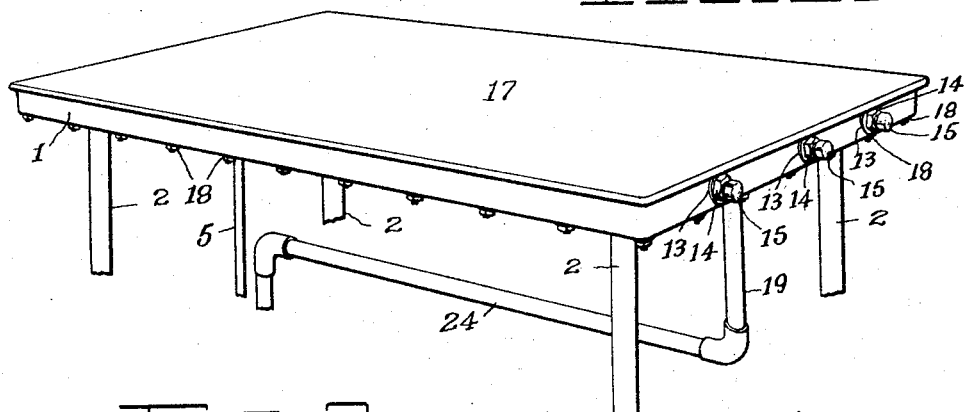
Figure 1, is a perspective view of my candy cooling table.
Figure 2:
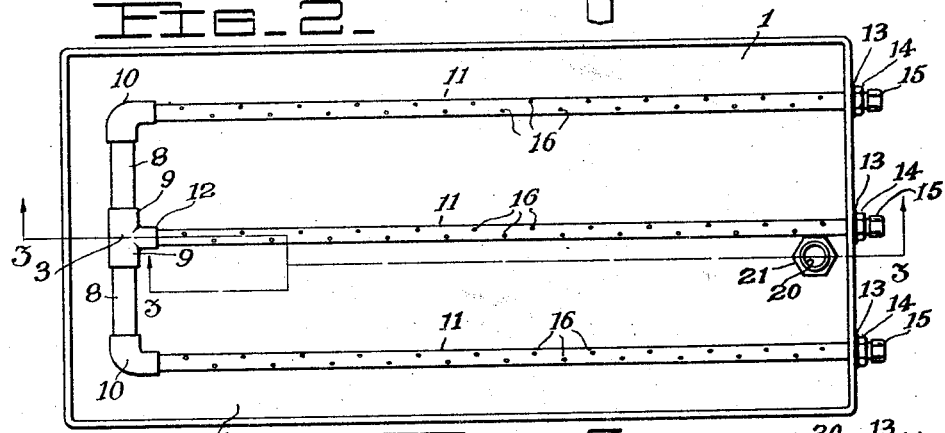
Figure 2, is a plan view of same with top removed.
Figure 3:
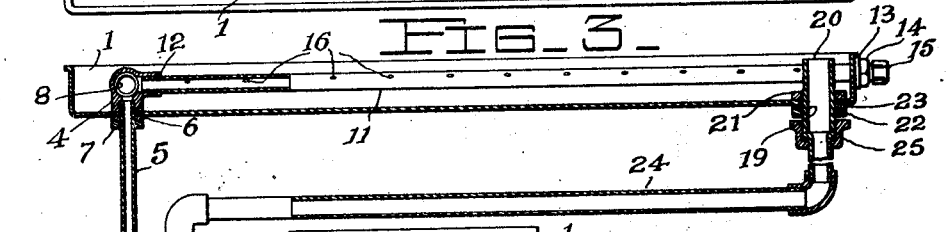
Figure 3, is a section at lines 3—3 of Figure 2.

1 is a pan having leg supports 2, and 3 is a four way union within one end of the pan the lower branch 4 of which union rests upon the bottom of the pan, a water supply pipe 5 being tapped within this branch through the pan.

A packing washer 6 around this pipe is firmly clamped against the bottom of the pan by means of a nut 7 driven on the pipe, thus making a watertight connection.

8 are short pipes whose inner ends are tapped within the lateral branches 9 of the union 3 and whose outer ends are tapped within elbows 10. 11 are straight parallel water distributing pipes that are tapped at one end within the elbows 10 and within an inwardly extending branch 12 of the union 3.

As shown in the drawing, I prefer to use three of these pipes the middle one being connected within the branch 12 and the two outer ones connected with the elbows 10, although any desired number of pipes, unions and elbows may be employed. The free ends of these pipes project through the oposite end of the pan and are threaded exteriorly, and packing washers 13 surround these ends outside the pan and are firmly clamped against the pan by nuts 14 driven on the pipes, and the extremities of the latter are closed by caps 15 driven thereon.

These water distributing pipes have piercings or orifices 16 that are preferably staggered as shown so as to cause the water to be forced therefrom in jets that are directed upwardly and angularly against the bottom of the table or plate 17 which latter is secured on top of the pan by ordinary water tight means.

In the present instance this table is made of heavy steel plate, a gasket (not shown) being placed between the plate and the rim of the pan, and is secured to the pan by means of bolts whose heads are countersunk flush with the face of the plate and which are secured by nuts 18 driven on the bolts against the bottom of the pan. The face of the plate, as well as the bolt heads, is highly polished.

19 is an overflow pipe whose mouth 20 projects close to the bottom surface of the plate 17 and is above the orifices 16, so that it will be clear that the water level in the pan is always above the supply jets. This overflow pipe extends through the bottom of the pan and is threaded exteriorly and is clamped to the pan by means of nuts 21, 22, driven on the pipe against opposite faces of said bottom, a packer washer 23 being interposed between the lower nut and the pan so as to make a watertight connection. A drain pipe 24 is secured to the lower end of the pipe 19 by means of an ordinary stuffing box 25.

The overflow pipe is considerably larger than the water supply pipe thereby insuring rapid drainage and a consequent good water circulation, so that fresh cool water is continuously acting on the plate 17.

The perforations or orifices 16 being below the water level, the jets of water delivered angularly against the bottom of the plate will cause a swirling of the water with a washing effect, which effects a uniform cooling of the plate throughout its area with no appreciable water pressure against the plate.

The water distributing pipes may be cleaned by simply removing the caps 15 and running any ordinary swab or brush through the pipes and the latter may be washed out by the force of the water when the latter is turned on, or the pipes may readily be removed for inspection or replacement, without disturbing the top plate.

Figure 4:
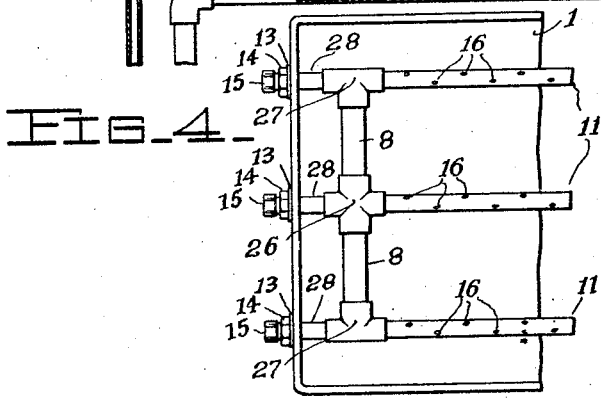
Figure 4, is a fragmentary plan view with the table removed but showing a slight modification of my invention.

In some instances, a five way union 26 and three way unions 27 may be used instead of the union 3 and elbows 10, and short pipes 28 may be tapped therein and extended through the end of the pan, as shown at Figure 4, and provided with caps at their ends and water tight means precisely like the caps 15, washers 13 and nuts 14 hereinbefore described, the particular advantage of this construction being that a swab or brush may be run entirely through the pipes.

If space is not a desideratum, it will be obvious, of course, that the pipes 11 may be projected through the end of the pan and the structure comprising the central union, pipes 8, the lateral unions and the water supply pipe located outside the pan, and therefore my invention is not limited in these respects.

What is claimed is:—

A candy cooling table comprising a pan, a top secured over said pan by water tight means, a water supply pipe led into said pan, cross pipes within the pan at one end thereof and in communication with said supply pipe, straight parallel and removable distributing pipes leading from the cross pipes and extending through the opposite ends of said pan and having water tight closures at their free end and provided with water discharge orifices, and an overflow pipe leading into said pan and with its mouth extending above said orifices.

In testimony whereof I affix my signature hereto.

WILLIAM G. WILSON.